April 12, 1966     A. SHANOK ET AL     3,245,864
COMPOSITE MOLDING STRIP
Original Filed April 1, 1955     2 Sheets-Sheet 1

INVENTORS.
ABRAHAM SHANOK
VICTOR SHANOK
JESSE SHANOK
BY Abraham Friedman
atty.

April 12, 1966  A. SHANOK ET AL  3,245,864
COMPOSITE MOLDING STRIP
Original Filed April 1, 1955

INVENTORS.
ABRAHAM SHANOK
VICTOR SHANOK
JESSE SHANOK dess
3,245,864
COMPOSITE MOLDING STRIP
Abraham Shanok, Victor Shanok, and Jesse P. Shanok, all of 863 65th St., Brooklyn, N.Y.
Original application Apr. 1, 1955, Ser. No. 498,608. Divided and this application Oct. 26, 1962, Ser. No. 243,172
1 Claim. (Cl. 161—106)

This invention relates to plastic coated flexible strips, tapes, webs, etc. and the extrusion apparatus involved in the fabrication process thereof. This application is a continuation in part of our application Serial No. 413,524, filed March 2, 1954, now Patent No. 2,774,811, and a division of our application Serial No. 498,608, filed April 1, 1955, now abandoned.

One of the basic problems encountered in the fabrication of thin flexible strips encased in plastic is to maintain the strip in an unflexed condition during the application of the plastic coating. Should flexure during coating occur the plastic will not be applied uniformly, the finished product will be wrinkled and passage of the strip through the usual extrusion die will be impeded resulting in a generally inferior article. Inasmuch as the plastic material is forced into contact with the strip while in a fluid condition, the existence of pressure differentials in the region surrounding the exposed portion of the strip will deflect the strip transversely resulting in the aforementioned defects.

Synthetic resins such as vinyl chloride, cellulose acetate butyrate, and the like, undergo deterioration when retarded in flowing through an extrusion device. The detained material assumes a darker hue than the material which passes through the extrusion apparatus at the normal flow rate causing the finished product to develop unsightly streaks. Consequently it is imperative that the extrusion apparatus and process be capable of providing a steady uniform flow of plastic to avoid such blemishes.

In arrangements wherein plastic material is fed transversely to the longitudinal axis of a strip, the tendency to cause transverse pressure differentials and retarded axial movement of portions of the plastic material is relatively high. However transverse feeding arrangements are generally used since the resultant apparatus is compact, less complicated, and easier to operate than other possible feeding variations. Consequently for the best results an extrusion apparatus involving a transverse plastic feeding arrangement must alter the flow of plastic prior to contact with the flexible strip so that the flow lines are parallel substantially to the axis of the strip without causing relative flow retardation.

The inclusion of air bubbles in the plastic stream will also result in an unsightly and non-uniform deposition of plastic. Thus if the flow is excessively turbulent through the extruding apparatus air entrainment will result. The flow path must be specifically designed to mitigate the occurrence of turbulence due to sudden changes in flow direction or variations in the cross-sectional flow area.

It is therefore the primary object of this invention to provide an extrusion apparatus which will encase a thin flexible strip of material in a plastic shell or casing of predetermined shape wherein the shell is of uniform cross-section, density, color and the longitudinal axis of the strip is a straight line substantially.

A more specific inventive object is the provision of an extrusion apparatus for the application of a coat of plastic to a flexible strip of material wherein the plastic material is applied to the strip with equal pressures transversely to the strip axis and the flow of all plastic material through the apparatus proceeds at the same rate and does not include air bubbles and wherein a substantial extrusion rate is realized.

Another more specific inventive object involves the provision of an extrusion apparatus for applying a coat of plastic to a flexible strip wherein the plastic is initially fed transversely to the longitudinal axis of the strip and is subsequently forced to assume a flow path parallel to the strip axis just prior to contact with the strip resulting in the deposition of a plastic coat of uniform color, cross-section, and density.

A still further specific inventive object involves an extrusion apparatus of the class involved in the foregoing objects wherein the pressure in the apparatus cannot exceed a specific maximum and wherein the plastic material contacts a relatively small length of the flexible strip prior to passing through an extrusion die.

Another primary inventive object involves an extrusion process wherein plastic material is applied to a flexible strip without bending, wrinkling or distorting the strip and the resultant coating has a uniform cross-section, color and density.

A further specific inventive object involves a process for encapsulating a flexible strip within a uniform shell of plastic wherein the plastic material is caused to flow parallel to the axis of the strip prior to contact with the strip and wherein only a relatively short laterally unbraced length of the strip is exposed for contact with the plastic stream just before entering an extrusion die.

Another primary object of this invention is the provision of a flexible strip of material encapsulated in a shell of plastic of uniform cross-section, color and density and having a predetermined shape.

Further objects and advantageous features incorporated in the instant invention will become apparent from the following detailed description and appended claim when read in conjunction with the annexed drawings in which:

Figure 1:
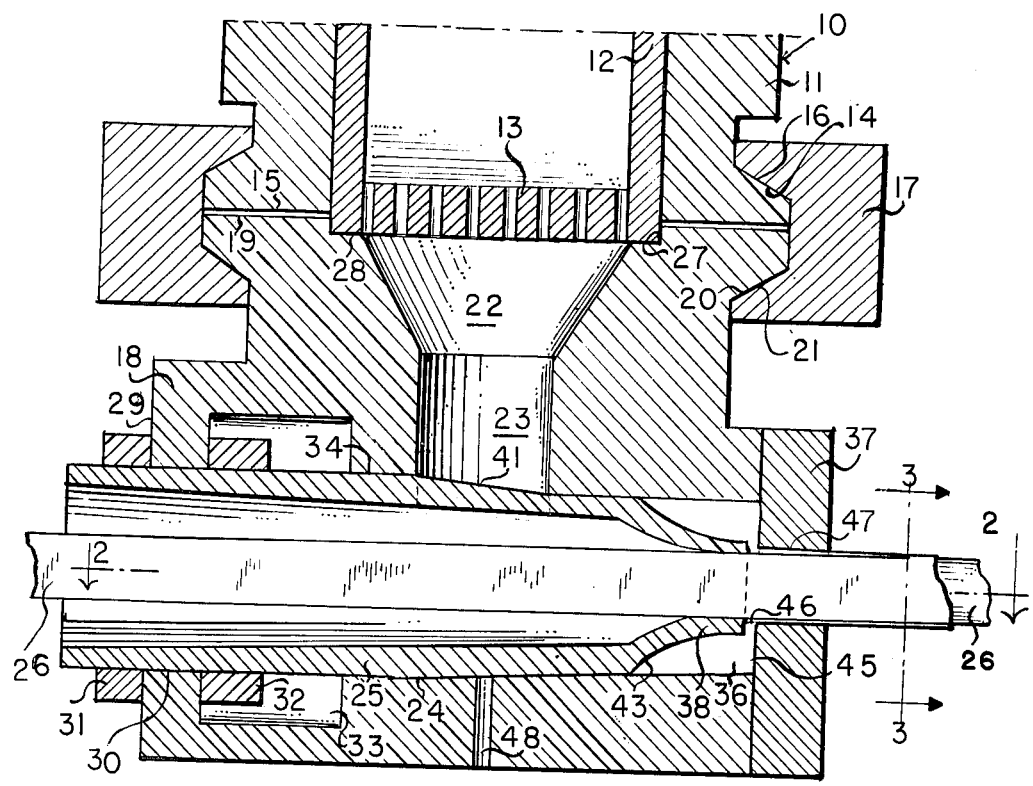
FIGURE 1 is a longitudinal cross-section through the extrusion device showing the flexible strip in relation to the cylinder and cross-head.
Figure 2:
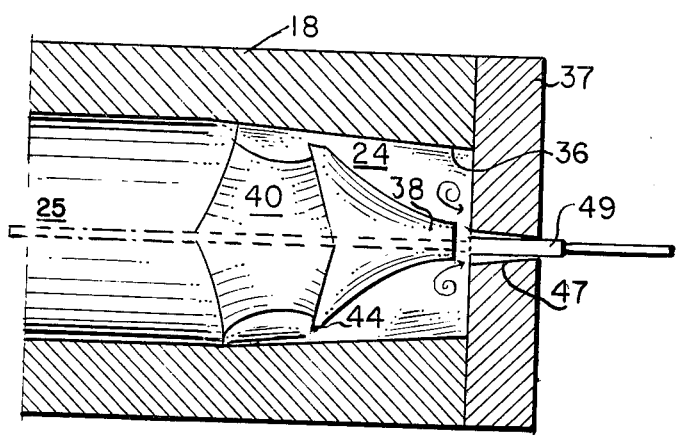
FIGURE 2 is a sectional view of the cross-head taken along line 2—2 of FIGURE 1 in which the guider tube and strip are not shown in section.
Figure 3:
FIGURE 3 is a transverse section through plane 3—3 of FIGURE 1 showing a cross-section of the finished plastic coated strip.

Referring to FIGURE 1, the novel extruder 10 is seen to comprise a cylinder 11 in which is secured a liner 12 including a breaker plate 13. Liquified plastic material is forced by conventional screw means not shown under pressure through liner 12. Since the fluid plastic must then flow through the restricted passageways presented by the breaker plate 13, air bubbles and other extraneous materials possible contained in the stream are substantially eliminated and the material is otherwise fed in suitable form to the extrusion head.

A peripheral beveled shoulder 14 is provided adjacent the inner head end 15 of the cylinder 11 to coact with a similarly shaped surface 16 of clamp ring 17 for securing purposes. A crosshead 18 having an inlet end 19 adjoins the cylinder head end 15 and also includes an inclined peripheral shoulder 20 which coacts with a corresponding surface 21 of the clamp ring 17. Thus the head of cylinder 11 and the cross-head 18 are secured together with the clamp ring 17 whose oppositely inclined surfaces 16 and 21 bear against the contiguous inclined surfaces of the shoulders 14 and 20 respectively.

The crosshead 18 is formed with a central bore 22 axially aligned with the cylinder 11. The upstream end of the bore 22 is tapered from a larger upstream dimension adjoining the breaker plate 13 to a uniform passageway 23 of smaller dimension. Passageway 23 intersects a longitudinal bore 24 of variable contour which receives a guider 25 through which the flexible strip material 26 is fed.

Adjacent to the outer surface of the end 19, there is provided a bore 27 large enough to snugly receive the liner 12. An annular shoulder 28 which intersects the bore 27 transversely forms a supporting surface for the inner end surface of the breaker plate 13. When the clamp ring 17 forces the cylinder 11 towards the crosshead 18 the breaker plate 13 sealingly contacts the crosshead along the shoulder 28.

Figure 4:
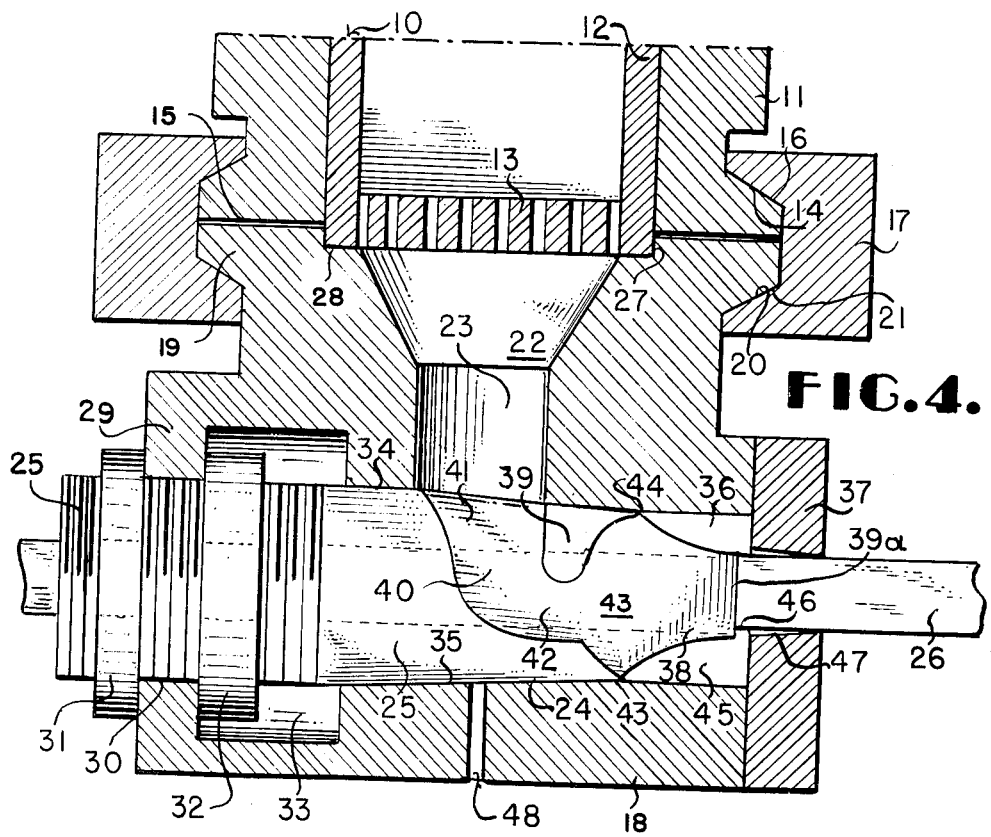
FIGURE 4 is a longitudinal section similar to FIGURE 1 excepting that the guider which encloses and feeds the flexible strip is not in section.

A flange 29 having a central bore 30 provides an outer support for the guider 25 which projects through the bore 30. The outer end of the guider is threaded externally for coaction with the spaced nuts 31 and 32 which are adjustably located on either side of the flange 29 (see FIGURE 4). A transverse slot 33 is formed through the crosshead housing wall for the reception and manipulation of the inner nut 32. Thus with the guider 25 projected through the bore 30 the nuts 31 and 32 are adjusted axially along the fitting 25 to abut the opposite sides of the flange 29 thereby affixing the fitting to the housing.

Inwardly of the slot 33, the bore 24 includes an annular portion 34 which extends axially towards the bore 22 to meet a tapering portion 35 positioned to under lie the bore 22. Portion 35 tapers inwardly circumferentially to a reduced innermost portion 36 which is located adjacent a die 37. Excepting for the tip portion of the guider which adjoins the reduced bore portion 36, the external surface of the guider 25 is complementary to corresponding portions of the bore 24. The tip 38 of the guider tube 25 which is encompassed by the bore portion 36 comprises a hollow wedge-like transition section tapering from a larger substantially annular section 39 to a substantially rectangular section 39a. The exterior of the guider 25 within section 39 is recessed (as shown by the shaded area of FIGURE 4) radially inward to form a flow channel 40 between the guider and the crosshead bore portion 35. The channel 40 varies uniformly in section from a relatively larger section 41 immediately adjoining the bore 22 to a substantially reduced section 42, whereupon the channel 40 again increases in section to a maximum at 43. Chanel 40 communicates with the chamber 45 surrounding the head 38 at the axial point corresponding to the location of the strip 44.

The guider tip 38 terminates a small axial distance from the inner wall of the die 37 whereby only a small exposed length 46 of the flexible strip 26 is presented for contact with the plastic stream emitted into chamber 45.

Figure 5:
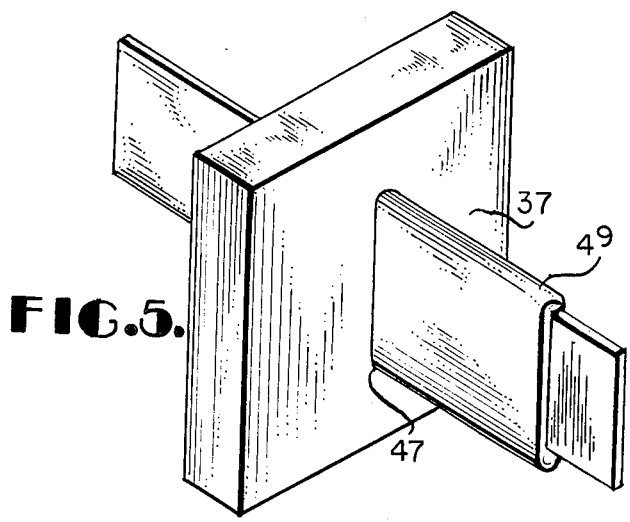
FIGURE 5 is a perspective view of the coated flexible strip passing through the die.
Figure 6:
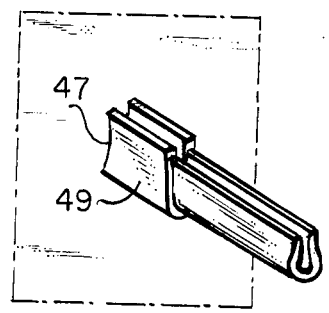
FIGURE 6 is a perspective view of a coated strip of different shape passing through a corresponding die modification.

The die 37 comprises a block having a central tapered extrusion hole 47 of any desired cross-section and provides an outlet end closure for the bore 24. The extrusion hole 47 is shaped similarly to the strip 26 and is slightly larger in cross-section providing clearance space for the passage of the extruded plastic. In FIGURES 5 and 6, die holes of varying shapes are depicted. These showings should not be interpreted as restricting the inventive scope since the particular shape desired is not material to the invention.

Substantially in alignment with the axis of the bore 22 is a vent hole 48 communicating with the bore 24 whereby excess pressure due to the plastic stream is relieved to the atmosphere. The size of the vent hole 48 may be further reduced by inserting suitably dimensioned plugs therein provided with reduced axial openings. The degree of pressure relief may also be adjusted by adjusting the position of the guider tube within the bore by means of nuts 31 and 32 to thereby adjust the clearance between the outside peripheral wall of the tube and the inner wall surface of bore 24.

It should be particularly noted that the guider 25 restricts contact between the plastic stream and the strip 26 to the extremely short portion 46. During the passage of the strip through the guider 25 no external pressures are exerted upon the strip and the strip is maintained in a straight and unbent condition. The head 38 of the guider (see FIGURE 1) is shaped to maintain the desired form of the strip during the feeding process. Consequently upon leaving the fitting the strip 26 is in the shape desired for the reception of a plastic coating.

Furthermore the 90° change in flow direction from bore 22 to chamber 45 is gradually effected creating no dead spots for the detention of plastic material nor objectionable turbulence. Since the flow channel necks down to a minimum cross-section in the vicinity of the 90° change in direction, the velocity is accelerated further preventing detention of plastic particles. The increased space provided by chamber 45 decelerates the flow velocity to a rate comparable to the inflow velocity and affords ample free flowing plastic for extrusion through the die hole. Due to the streamlined shape of the fitting head 38 the turbulence involved in an expansion of the flow area is reduced to a minimum. Moreover a spiral action is generated in the plastic material in the vicinity of the intersection of the die 37 and the bore 24 in chamber 45 and acts to form a uniform deposit upon the strip material.

In operation the guider 25 is first inserted into bore 24 of the crosshead and then secured to the crosshead flange 29 by means of the spaced nuts 31 and 32. The strip 26 is then fed through the fitting by conventional feeding apparatus (not shown) and emerges from the guider tip 38 just prior to passage through the aligned die hole 47. It should be here noted that the strip 26 is preformed to assume a shape similar to the die shape and the said shape is maintained by the guider 38. As the strip is fed through the fitting 25, fluid plastic under pressure is forced through the liner 12 by conventional means (not shown). Due to the streamlined flow provided by channel 40 and head 38 a uniform layer of pure plastic is deposited upon the periphery of the strip 26 as restricted to the exposed section 46. Since the deposition occurs as the result of relative axial flow equally distributed about the strip periphery, pressure differentials tending to flex the strip are substantially eliminated. This latter effect when taken together with the extremely short unsupported strip span 46 particularly when exposed to the spiral action of the plastic material makes it virtually impossible to bend, wrinkle or otherwise alter the shape of the strip.

Upon passing through the die hole 47, the plastic is shaped and set into the final finished forms 49 seen in FIGURES 5 and 6.

By means of the apparatus in process herein disclosed it is possible to achieve the complete encapsulation of strip material such as foils, fabrics, paper, etc. which would ordinarily buckle, break, wrinkle or be otherwise distorted when subjected to conventional coating processes and apparatus. The encapsulation of metallic foils in a thickness of the order of .002 inch is readily achieved. Thus, for example, an aluminum foil of approximately .002 inch may be readily encapsulated within a shell of cellulose acetate or cellulose acetate butyrate in clear form to produce a rigid body of strip material which very closely resembles in appearance a chromium plated strip. The coating or encapsulating material forms a continuous and adherent coating which seals in the metal foil and prevents deterioration or corrosion. The invention also permits the production of a wide variety of shaped strips which find numerous applications as molding strips, trim strips or as ornamental or structural elements. The invention is further adapted to produce electrical conductors of thin strip material surrounded by an insulating coating and wherein a number of such strips may be incorporated spaced and insulated from each other by means of the encapsulating material to thereby produce multiple conductors within a single strip body.

We have here shown and described a preferred embodiment of our invention. It will be apparent, however, that this invention is not limited to this embodiment and that many changes, additions and modifications can be made in connection therewith without departing from the spirit and scope of the invention as herein disclosed and hereinafter claimed.

We claim:

A composite strip suitable for use as a molding strip, as a trim strip or as an ornamental or structural element, said composite strip comprising a core member of normally bexible aluminum foil approximately .002 inch in thickness, said foil being ordinarily subject to buckling, breakage, wrinkling or distortion, said core strip being encapsulated within a shell of transparent thermoplastic material which is extruded thereover, said thermoplastic material comprising a cellulose acetate butyrate resin, said shell encasing said aluminum foil core and forming a continuous coating thereover which coating is of a uniform cross-section throughout its length and renders the composite strip sufficiently rigid and maintains its shape so that it is suitable for use as a trim strip, as a molding strip, or as an ornamental or structural element.

References Cited by the Examiner

UNITED STATES PATENTS

| | | | |
|---|---|---|---|
| Re. 24,114 | 1/1956 | Adler | 161—43 |
| 1,037,515 | 9/1912 | Oeser | 161—213 |
| 1,457,921 | 6/1923 | Brunks | 161—43 |
| 1,862,332 | 6/1932 | Coffman | 161—213 |
| 1,947,516 | 2/1934 | Broadman | 161—43 |
| 2,047,758 | 7/1936 | Werring et al. | 161—214 |
| 2,199,526 | 5/1940 | McCowen | 264—171 |
| 2,241,312 | 5/1941 | Lutz | 161—215 |
| 2,387,773 | 10/1945 | Salo et al. | 117—166 |
| 2,447,420 | 8/1948 | Moore | 264—171 |
| 2,566,514 | 9/1951 | Bischoff | 117—166 |
| 2,635,970 | 4/1953 | Salo et al. | 117—166 |
| 2,712,521 | 7/1955 | Aragones et al. | 161—215 |
| 2,774,811 | 12/1956 | Shanok et al. | |
| 3,138,834 | 6/1964 | Shanok et al. | 161—43 |

ALEXANDER WYMAN, *Primary Examiner.*

EARL M. BERGERT, *Examiner.*

R. J. ROCHE, R. I. SMITH, *Assistant Examiners.*